O. SMUCK.
STOP FOR DOUBLETREES.
APPLICATION FILED APR. 18, 1918.
1,326,219.
Patented Dec. 30, 1919.
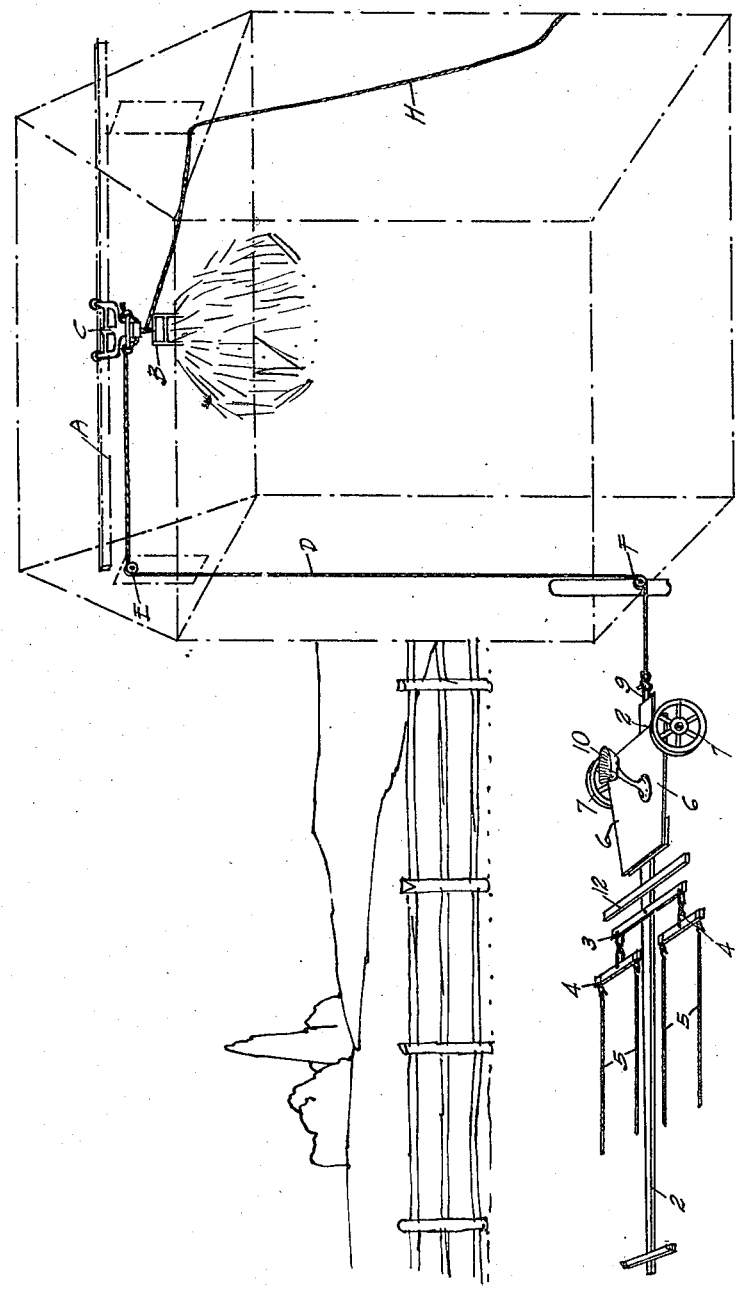
INVENTOR
OSBORNE SMUCK
Attorney

UNITED STATES PATENT OFFICE.

OSBORNE SMUCK, OF GLANFORD TOWNSHIP, WENTWORTH COUNTY, ONTARIO, CANADA.

STOP FOR DOUBLETREES.

1,326,219. Specification of Letters Patent. Patented Dec. 30, 1919.

Application filed April 18, 1918. Serial No. 229,334.

*To all whom it may concern:*

Be it known that I, OSBORNE SMUCK, a subject of the King of Great Britain, residing at Glanford township, in the county of Wentworth and Province of Ontario, Canada, have invented certain new and useful Improvements in Stops for Doubletrees, of which the following is a specification.

My invention relates to improvements in a double-trees carriage for unloading hay, and consists essentially of a tongue mounted at its rear end part upon ground wheels and carrying thereupon a suitable platform, a transverse piece secured to the tongue rearwardly adjacent the doubletrees, and means on the rear end of the tongue to secure thereto the hay fork traveler pulley rope.

The invention has for its objects to provide means whereby to elevate the doubletrees and the rope from the ground in the act of operating a traveling hay fork, or any device in which it is the custom to drive a team of horses alternately backward and forward, for the purpose of eliminating wear and tear upon the doubletrees and rope caused by the constant friction upon the ground, eliminating the dust usually accumulated by the constant irritation of the ground in the path of the doubletrees, and eliminating the possibility of the doubletrees becoming tangled with the horses' feet when coming to a halt after backing.

A further object is to provide means to overcome the danger of one end of the doubletrees swinging back and striking the driver in the event of one of the traces becoming loose or breaking.

A still further object is to permit the driver to be seated while at work.

Further objects which will become apparent to those skilled in the art may be attained by the construction, illustrated in the accompanying drawing, although the invention may be embodied in other forms, the construction shown being chosen only by way of an example.

Reference being had to the accompanying drawing, which is a perspective view of my invention showing it as it appears when in use, similar reference characters referring to similar parts throughout.

In the drawing, a barn is represented by chain lines. A indicates a track hung therein, B the hay fork, and C the traveler therefor adapted to reciprocally operate upon said track by means of the rope D, passing over pulleys E and F. H is the trip rope for the hay fork. The above mentioned parts are not new, and hence do not form part of the present invention.

2 indicates a tongue having pivotally connected to it in the usual manner doubletrees 3 provided with whiffletrees 4 with traces 5. The said tongue carries a platform 6 at its rear end part, and is provided with suitable ground wheels 7. The rope D is secured to the rear end of the tongue 2 by means of a U bolt 9 fixed thereto, or by other approved hitch if desired, and, thus it will be seen that a direct pull is constituted upon said tongue. The platform 6 is provided with a suitable seat 10 for the driver or operator.

The foremost and outstanding feature of my invention is the provision of a transversly disposed piece 12 rigidly secured to the tongue 2 in rear proximity to the doubletrees 3, and in the same horizontal plane therewith. The said piece is positioned so as to permit ample play for the doubletrees relative to the movement of the horses, but it will be seen that should one or both of the traces on one whiffletree break or become parted therefrom, or in the event of one end of the doubletrees becoming light in any manner, that end will engage the piece 12 and thus eliminate the possibility of the same striking the driver.

Having now fully described my invention, what I claim and desire to secure by Letters Patent of the United States, is:—

In a tongue truck including a doubletree, a transverse member rigid with the tongue in rear of the doubletree and in such proximity thereto as to limit the turning movement of the same, substantially as and for the purpose set forth.

In testimony whereof I have affixed my signature.

OSBORNE SMUCK.

Witness:
H. G. HENDRY.